Patented June 17, 1930

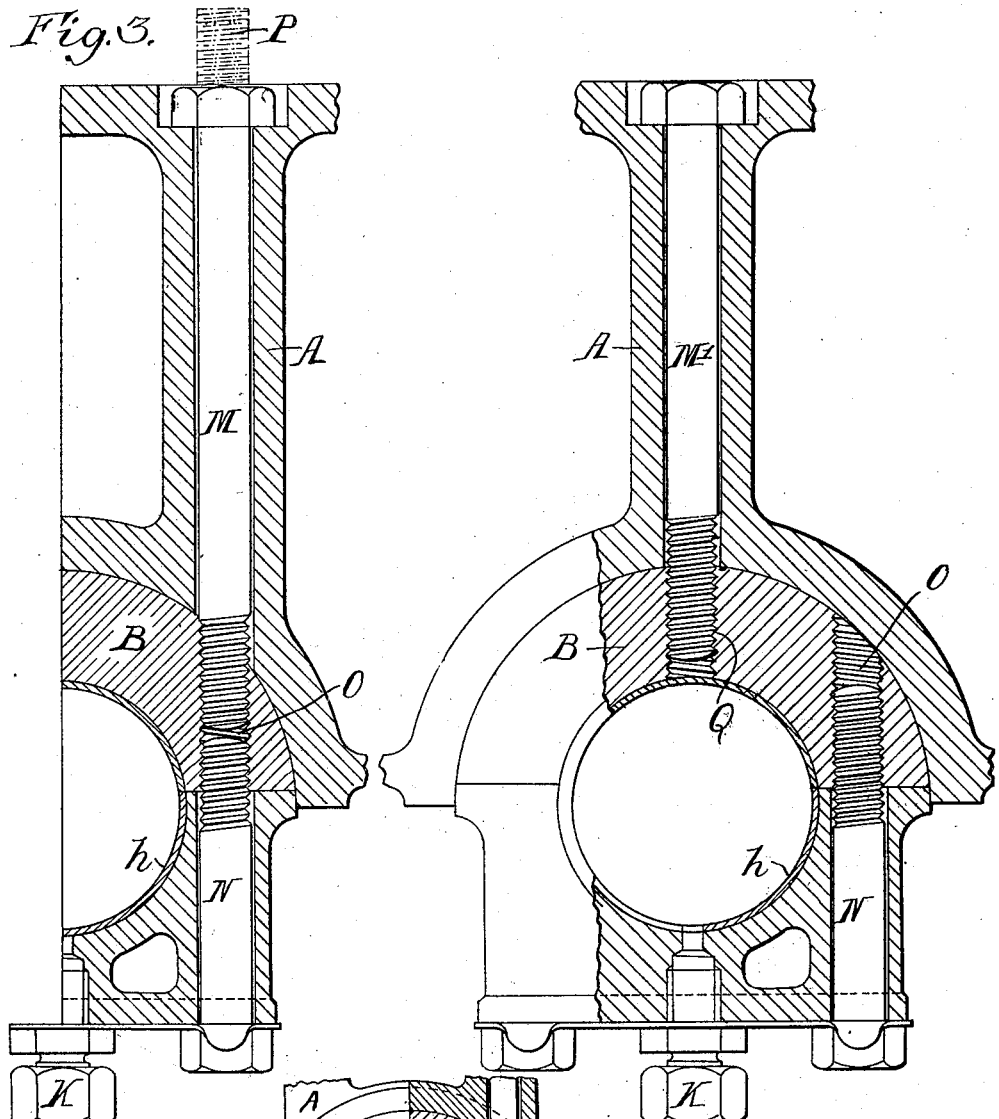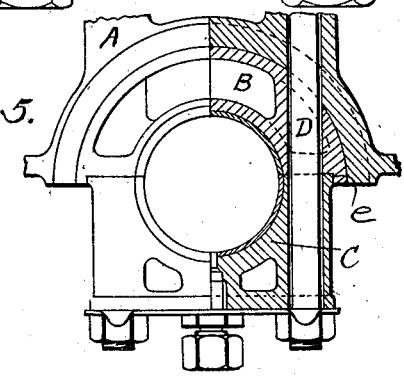

1,764,672

UNITED STATES PATENT OFFICE

HERBERT AUSTIN, OF BROMSGROVE, ENGLAND

CRANK-SHAFT BEARING

Application filed October 10, 1927, Serial No. 225,159, and in Great Britain December 7, 1926.

This invention relates more especially to the bearings of the crank shafts of internal combustion engines; but is applicable to other bearings of a like type, and has for its object to provide an improved construction thereof.

According to the main feature of this invention, the bearing is constructed in two halves, as is usual; but each half bearing is of a much greater relative diameter than has heretofore been usual and the holes for the bolts or set pins by which the half bearings are held in place are formed so that the bolts or set pins pass through the half bearings themselves, instead of at either side thereof and through the cap as has heretofore been usual.

The bearings are preferably formed of a relatively hard metal such as iron, steel or brass, so that they are very durable and are well adapted for the formation of tapped holes therein. They may be provided with white metal liners in the usual way.

As the bolts or set-pins pass through holes in the half bearings themselves, there is no need to provide a separate cap as the outer half of a bearing may be utilized as such.

In order that the invention may be clearly understood, convenient applications thereof are described with reference to the drawings herewith, of which:—

Figures 3, 4 and 5 are part sectional views illustrating modifications of the invention.

Figures 1, 2:
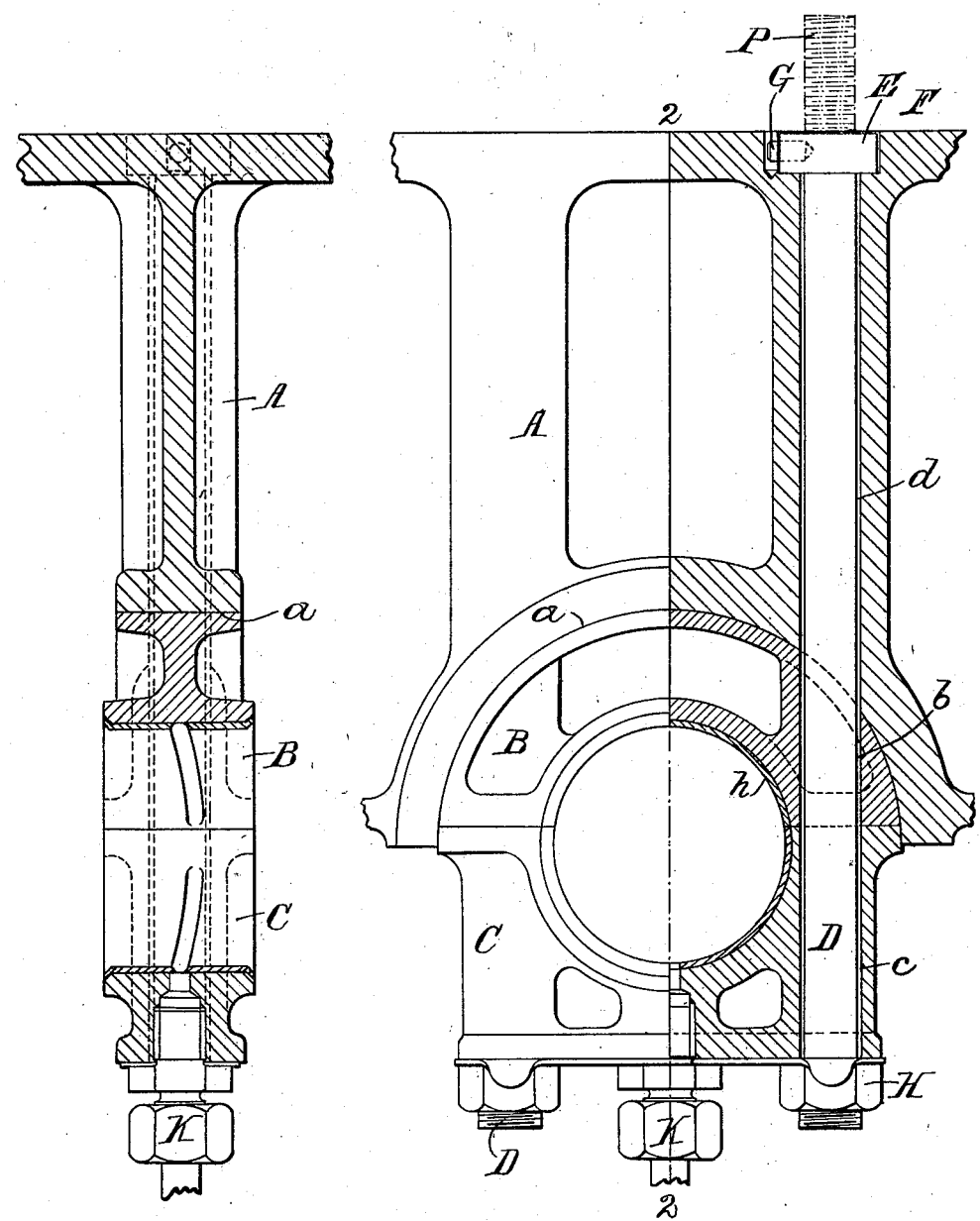
Figure 1 is a part elevation and part section of a crank case bearing constructed according to this invention.
Figure 2 is a section taken on the line 2, 2, of Figure 1.

Referring first to Figures 1 and 2, A is a portion of the crank case constituting a bearing carriage and its under surface $a$ is of semi-cylindrical form concentric with the axis of the shaft and adapted to receive the upper half B of the bearing. C is the lower half of the bearing secured in relation to the upper half by long bolts D which pass right through clearance holes $c\ b$ in the bearing halves C and B, respectively, and through clearance holes $d$ in the carriage A. Each bolt D at its upper end is provided with a collar E lying within a recess F at the top of the crank case and is provided also with a grub screw G the head of which is adapted to lie within a notch in the side of the recess F to prevent the corresponding bolt D from turning. Each bolt D is provided on its lower end with a nut H.

The bearing half B is somewhat less than a semi-circle so that it is sunk somewhat within the carriage whereby the outer half C (which is correspondingly greater than a semicircle) is enabled to enter within the carriage to some extent to locate itself properly in relation to the half B; but, since the cylindrical portion $a$ of the carriage A does not exceed a semi-circle there is no tendency for the half bearing C to become wedged therein.

It will be seen that the outer half bearing C forms also the cap. Each half bearing may be of hard metal provided with a white metal liner $h$ in the usual way. K is a supply pipe for lubricating oil.

Referring to Figure 3, each long bolt D of Figure 1 is replaced by two set pins M N each of which screws at its inner end into a tapped hole O in the upper half bearing B.

Thus two set pins M serve to secure the upper half of the bearing in place in the crank case, while two lower set pins N serve to secure the lower half.

If desired the long bolts D of Figure 1 or the set-pins M of Figure 3 may be extended upwards as shown at P beyond their heads and screw-threaded to receive nuts used for holding down the cylinder block. Utilizing the long bolts D for securing the cylinder block is not, however, very satisfactory because they tend to stretch in use.

Referring to Figure 4 a set-pin M' for securing the upper half bearing, is placed in the mid vertical plane of the crank case and screws at its lower end into a central tapped hole Q. The other set pins N screwing into tapped holes O as before.

Figure 5 is similar to Figure 1 except that the upper half bearing B is a full semicircle as regards its exterior surface but its inner face is recessed at $e$ to receive and locate the lower half bearing C which at its upper face is shaped to fit into the recess.

Having fully described my invention what I claim and desire to secure by Letters Patent is:—

1. A bearing for a crank shaft comprising a bearing member in two parts, an inner part bearing and an outer part bearing, a bearing carriage having a part cylindrical concave surface to receive a counterpart surface of said inner part bearing, and said outer part bearing entering to some extent within the confines of said concave surface of the carriage, so that the said outer part bearing may transmit lateral pressure to said carriage, and securing bolts passing through said outer part bearing and through said inner part bearing, said bolts being entirely within the confines of the concave surface of said carriage at the line where said outer and inner bearing parts contact.

2. A bearing carriage for a crank shaft comprising a bearing member in two parts, an inner part bearing and an outer part bearing, a bearing carriage having a half cylindrical concave surface to receive a counterpart surface of said inner part bearing, said inner part bearing being somewhat less than a semi-cylinder, so as to permit of said outer part bearing entering within the confines of the carriage, and securing bolts passing through said outer part bearing and the said inner part bearing, said bolts being entirely within the confines of the concave surface of said carriage at the line where said outer and inner bearing parts contact.

3. A bearing for a crank shaft comprising a bearing member in two parts, an inner part bearing and an outer part bearing, a bearing carriage having a part cylindrical concave surface to receive a counterpart surface of said inner part bearing, and said outer part bearing entering to some extent within the confines of said concave surface of the carriage, so that the said outer member may transmit lateral pressure to said carriage, and securing bolts passing through said outer and inner part bearings and through said carriage, said bolts being entirely within the confines of the concave surface of said carriage at the line where said outer and inner bearing parts contact.

In witness whereof I have hereunto signed my name this 21st day of September, 1927.

HERBERT AUSTIN.